W. H. HANCOCK.
RESILIENT TIRE.
APPLICATION FILED AUG. 9, 1916.
1,216,988.
Patented Feb. 20, 1917.
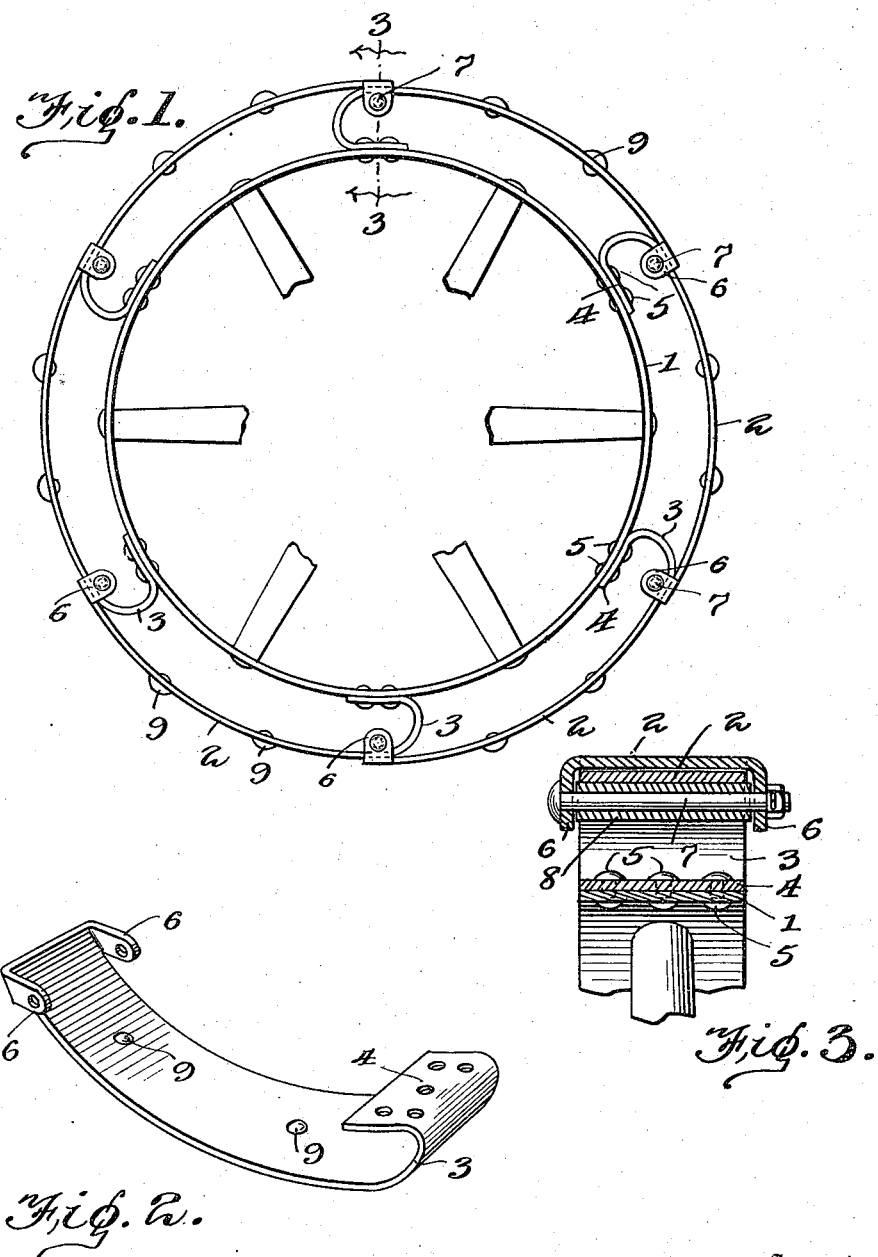
Witnesses
W. H. Lybrand
R. M. Smith
Inventor
W. H. Hancock
By Victor J. Evans
Attorney

UNITED STATES PATENT OFFICE.

WILLIAM HEROLD HANCOCK, OF EXCEL, ALABAMA.

RESILIENT TIRE.

1,216,988.      Specification of Letters Patent.      Patented Feb. 20, 1917.

Application filed August 9, 1916. Serial No. 114,079.

*To all whom it may concern:*

Be it known that I, WILLIAM H. HANCOCK, a citizen of the United States, residing at Excel, in the county of Monroe and State of Alabama, have invented new and useful Improvements in Resilient Tires, of which the following is a specification.

This invention relates to resilient tires, the object in view being to provide a tire applicable to any vehicle wheel, said tire embodying an all metal construction which will absorb all ordinary road shocks and vibrations and prevent the transmission of the same to the axle and body of the machine, thus doing away with the use of pneumatic tires and the troubles and delays incident thereto.

With the above and other objects in view, the invention consists in the novel construction, combination and arrangement, herein fully described, illustrated and claimed.

In the accompanying drawing:

Figure 1 is a side elevation of a tire embodying the present invention.

Fig. 2 is a detail perspective view of one of the outer sections of the tire.

Fig. 3 is a cross section on the line 3—3 of Fig. 1 taken in line with one of the cross bolts.

The tire contemplated in this invention comprises an inner supporting band or hoop 1 composed of metal either iron or spring steel, said band or hoop forming the base member of the tire.

The outer tread member of the tire is composed of a plurality of arcuate sections each of which is described on a curve of which the axis of the wheel is the center. Each tread section is composed of spring steel and the main body portion thereof is of materially greater diameter than the base 1, the said body portion indicated at 2 being arranged in spaced relation to and normally concentric with the base member 1.

Each tread section 2 is inwardly offset and recurved to form a hook shaped portion 3 which terminates in an attaching flange 4 secured fixedly to the base member 1 by a plurality of bolts, rivets or the like indicated at 5. At its opposite extremity, each tread section is provided with inwardly extending lugs or ears 6 arranged in such spaced relation to each other as to straddle the adjoining tread section which it overlaps as shown in the drawing. A cross bolt 7 is inserted through the ears 6 so as to underly the adjoining tread section and admit of a relative longitudinal sliding movement between the adjoining sections. A roller 8 surrounds each bolt 7 and works against the adjacent tread section 2.

It will be understood that the tire may embody any desired number of tread sections 2 according to the size of the wheel and the resiliency required. Under the construction described, the outward or expanding movement of the tread sections is limited by the cross bolts coming in contact with the off-set hook-shaped portions 3 of said tread sections. At the same time, when a load is imposed on the tire or the latter is subjected to sudden shocks or impacts, the tread sections are adapted to slide upon and relatively to each other so as to take up and absorb said shocks producing practically the same effect as any pneumatic or cushion tires. Bolts or studs 9 may be provided on the tread sections 2 for non-skid purposes and to give greater traction to the wheel in case it is used as a driving wheel for a motor vehicle.

I claim:

A tire comprising an endless base band, a tread member normally concentric with said band and comprising a plurality of arcuate sections arranged in spaced relation to the band and overlapping and slidingly related to each other, each tread section having one end portion thereof recurved in the form of a hook and fixedly secured to the base band, each tread section being further provided at its free end with inwardly extending ears which ride against the side edges of the adjoining and overlapping tread section, and a bolt connecting said ears and extending under the adjoining tread section in proximity to the recurved hook-shaped portion thereof, whereby the expansive movement of the tread member is limited by said bolt coming in contact with said recurved hook-shaped portion of the adjoining tread section.

In testimony whereof I affix my signature.

WILLIAM HEROLD HANCOCK.

Copies of this patent may be obtained for five cents each, by addressing the "Commissioner of Patents, Washington, D. C."